Figure 1:
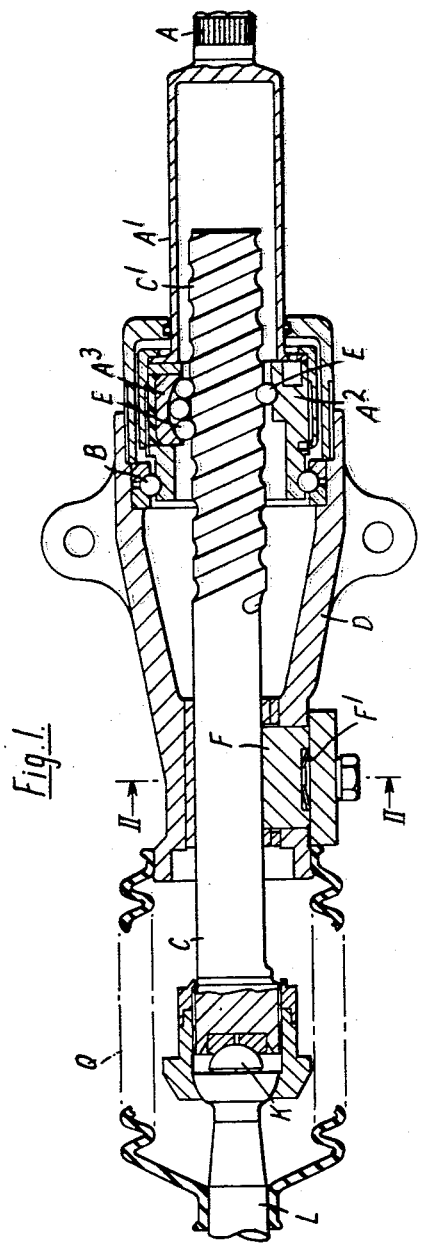

Oct. 27, 1964    F. J. ADAMS    3,153,948
VEHICULAR STEERING MECHANISM
Filed Feb. 6, 1963    3 Sheets-Sheet 1

Inventor
Frederick J. Adams
By Baldwin & Wight
Attorneys

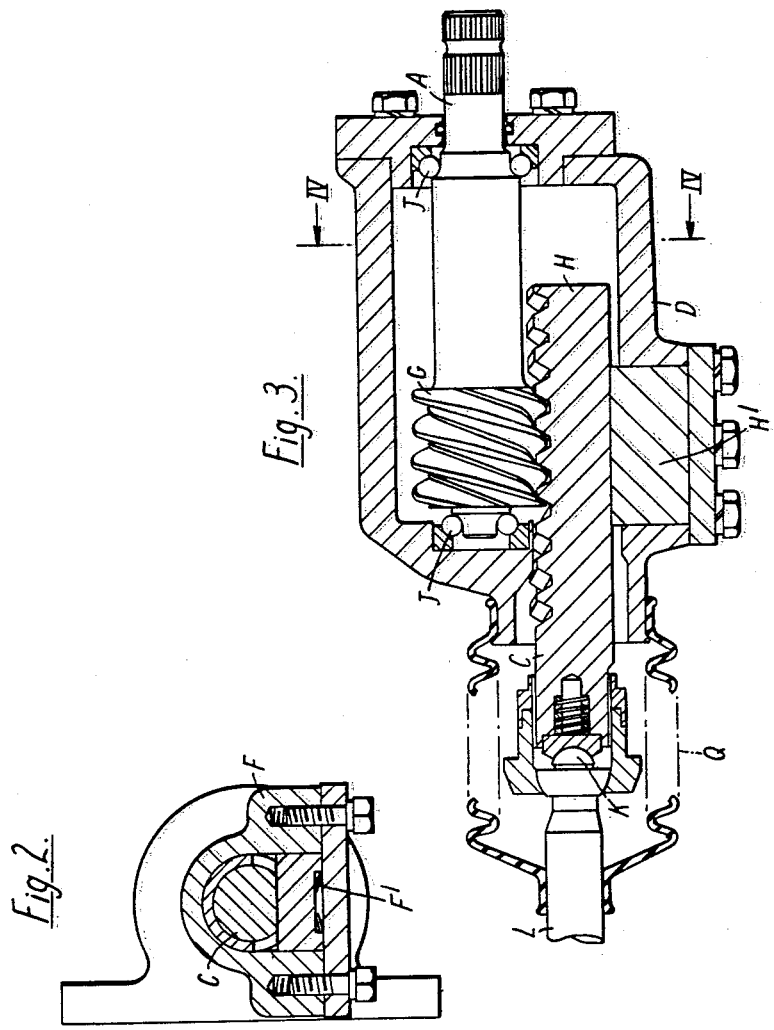

Oct. 27, 1964    F. J. ADAMS    3,153,948
VEHICULAR STEERING MECHANISM
Filed Feb. 6, 1963    3 Sheets-Sheet 3
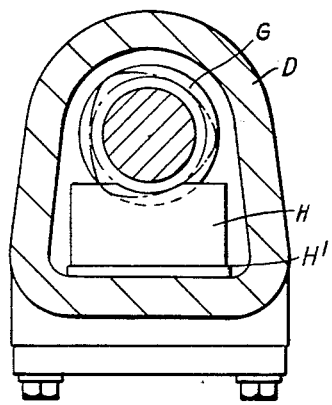
Fig. 4.
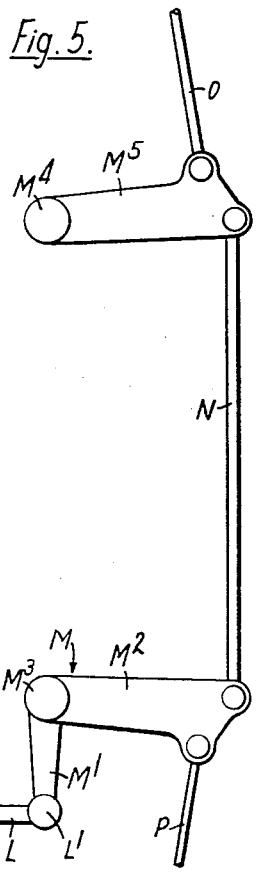
Fig. 5.
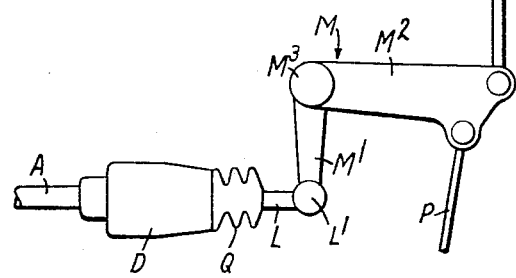
Inventor
Frederick J. Adams
By Baldwin & Wight
Attorneys United States Patent Office 3,153,948
Patented Oct. 27, 1964

3,153,948
VEHICULAR STEERING MECHANISM
Frederick J. Adams, Houghton Regis, England, assignor to Hydrosteer Limited
Filed Feb. 6, 1963, Ser. No. 256,567
Claims priority, application Great Britain, May 11, 1962, 18,292/62
8 Claims. (Cl. 74—499)

This invention relates to steering mechanism for road vehicles. Such mechanism of course comprises a gear having a manually operated input and an output coupled by a transmission of one sort or another to the wheels to be steered.

Now according to the present invention the steering gear is so arranged that an input component is arranged to be turned about its axis while the output component of the gear is arranged to be displaced longitudinally in a direction which is at least parallel or even concentric with the said axis.

The gear itself can be of any of the known kinds but is most conveniently of the rack type or of the screw and nut type.

In one construction using steering gear of the screw and nut type, the normal input component in the form of a steering column is connected either to the nut or to the screw of the gear, the other component (i.e. the screw or the nut) being slidably supported by the housing for the gear and extending beyond the housing for connection to the transmission. The said other or slidable component is in the form of a rod which is axially in line with the axis of turning of the input component and extends from the end of the housing opposite to the end at which the input component is disposed.

In another construction employing the rack-type of gear, the rotatably mounted input shaft is provided within the housing with a helical pinion which meshes with corresponding inclined teeth on a rack bar slidably supported in the housing to move in a direction parallel with the axis of the input shaft.

The invention is illustrated in the accompanying drawings. In those drawings, FIGURE 1 is a longitudinal section elevation showing the invention applied to a gear of the screw and nut type. FIGURE 2 is a cross section on the line II—II of FIGURE 1. FIGURE 3 is a view similar to FIGURE 1 showing the invention applied to a gear of the rack type. FIGURE 4 is a section on the line IV—IV of FIGURE 3, and FIGURE 5 is a diagrammatic view showing one manner of incorporating the gear of this invention in a steering mechanism.

Referring firstly to FIGURES 1 and 2 the input component is in the form of a spindle A which is splined at one end to receive a steering wheel or an extension of a steering operation apparatus coupled to such a wheel. The spindle A at its other end is formed to provide a hollow enlargement $A^1$ which is secured to a nut $A^2$ mounted to turn in a bearing B in the fixed housing D for the gear, the bearing B being of the ball and thrust type so that the nut $A^2$ while being rotatable is held against axial movement.

The output component is in the form of a rod C which is formed by an extension of a screw $C^1$, the extension being carried in a bearing F in the housing D and formed to hold the rod C against rotation while permitting it to partake of an axial or translatory motion. The rod C could be of non-circular cross section and the bearing of corresponding form. As shown a split bearing is employed, one part being urged by a spring $F'$ to maintain snug engagement with the extension.

In the particular case shown the screw and nut gear is of the circulating ball type, the balls indicated at E circulating in a track formed conjointly by the helical tracks in the nut $A^2$ and in the screw $C^1$ and also in a return block $A^3$ inserted in an opening in the nut $A^2$.

It will be clear that in the construction described the axis about which the input component A turns and the axis along which the output component C moves are not only parallel but are coaxial.

In the constructions shown in FIGURES 3 and 4 the input component A is fast with a helical pinion or worm G which is held by thrust bearings J against axial movement in the housing D. The teeth of the pinion mesh with inclined teeth on a rack bar H. This rack bar H is slidably supported by a block $H^1$ in the fixed housing D so as to move in a direction parallel with the axis of the input shaft A. In this construction, the input and output components are parallel to each other, but are laterally offset one from the other.

In both constructions shown, the output component is connected via a ball and socket connection K to a steering transmission apparatus comprising a coupling L, and in both constructions the coupling L can be connected to the housing D by a flexible bellows Q containing grease for lubrication.

In FIGURE 5 is shown diagrammatically one arrangement for coupling the component L to the wheels to be steered. The component L is pivoted at $L^1$ to one arm $M^1$ of a lever generally designated M pivoted at $M^3$ another arm $M^2$ of the lever M being connected by a link N to an arm $M^5$ pivoted at $M^4$, the two arms $M^2$ and $M^5$ being coupled respectively by links P and O to the wheels.

I claim:

1. In a vehicle steering gear, a fixed housing having opposite ends; an input component projecting through one end of said housing; an output projecting through the other end of said housing; means mounting said input component for angular movement about an axis extending from end-to-end of said housing and restraining said input component against movement in the direction of extent of said axis; and means mounting said output component for translatory movement substantially parallel to said axis and for restraining said output component against angular movement relative to said axis, said components being provided within said housing with directly mutually intermeshing portions for converting the angular motion of said input component into translatory motion of said output component, said input and output components having exteriorally of said housing means for connection respectively to steering operation apparatus and steering transmission apparatus.

2. Vehicle steering gear according to claim 1 in which said input and output components are axially aligned with one another.

3. Vehicle steering gear according to claim 1 in which said input and output components extend parallel to one another and to said axis, and are laterally offset one from the other within said housing.

4. Vehicle steering gear according to claim 1 in which the means restraining said output component against angular movement comprises an adjustable non-circular sliding bearing engaging a correspondingly shaped part of said output component.

5. Vehicle steering gear according to claim 4 including spring means urging said bearing into engagement with said part of said output component.

6. Vehicle steering gear according to claim 1 in which said intermeshing portions comprise a screw portion of said output component and a nut portion of said input component.

7. Vehicle steering gear according to claim 6 comprising transmission balls between the threads of said screw and nut portions, said nut portion having a ball return member.

8. Vehicle steering gear according to claim 1 in which said intermeshing portions comprise a rack portion of said output component and a pinion portion of said input component.

References Cited in the file of this patent

UNITED STATES PATENTS

| | | |
|---|---|---|
| 1,542,436 | Craig | June 16, 1925 |
| 2,093,298 | Welsh | Sept. 14, 1937 |
| 2,286,249 | Abbe | June 16, 1942 |
| 2,322,000 | Douglas | June 15, 1943 |
| 2,867,284 | Hruska | Jan. 6, 1959 |

FOREIGN PATENTS

| | | |
|---|---|---|
| 340,143 | Switzerland | Sept. 30, 1959 |
| 1,133,641 | Germany | July 19, 1962 |